United States Patent [19]
Morimoto et al.

[11] Patent Number: 5,870,748
[45] Date of Patent: Feb. 9, 1999

[54] METHOD AND APPARATUS FOR DERIVING AN OPTIMIZED CONFIDENCE RULE

[75] Inventors: Yasuhiko Morimoto, Yamato; Takeshi Fukuda; Shinichi Morishida, both of Yokohama; Takeshi Tokuyama, Machida, all of Japan

[73] Assignee: International Business Machines Corporation, Armonk, N.Y.

[21] Appl. No.: 738,151

[22] Filed: Oct. 25, 1996

[30] Foreign Application Priority Data

Nov. 1, 1995 [JP] Japan ..................................... 7-284836

[51] Int. Cl.$^6$ ...................................................... G06F 17/30
[52] U.S. Cl. .............................. 707/101; 707/104; 705/10
[58] Field of Search ............................. 705/10; 707/101, 707/104

[56] References Cited

U.S. PATENT DOCUMENTS 5,365,426  11/1994  Siegel et al. ............................. 600/509
5,615,341   3/1997  Agrawal et al. .......................... 705/10

OTHER PUBLICATIONS

DeLeo, J.M., "Receiver Operating Characteristic Laboratory (ROCLAB): Software for Developing Decision Strategies That Account For Uncertainty", (Apr. 1993) Proceedings Second International Symposium on Uncertainty Modeling and Analysis, College Park, Md., 25.

et al., "Using Upper Bounds on Attainable Discrimination to Select Discrete Valued Features", Neural Networks For Signal Processing VI. Proceedings of the 1996 IEEE Signal Processing Society Workshop, 4–6 Sep. 1996, Kyoto Japan, pp. 233–242.

R. Agrawal et al., "Mining Association Rules Between Sets of Items in Large Databases", Proc. of the ACM SIGMOD Conference on Management of Data, Washington, DC, May 1993, pp. 207–216.

R. Agrawal et al., "Database Mining: A Performance Perspective", IEEE Transactions on Knowledge and Data Engineering, Special Issue on Learning and Discovery in Knowledge–based Databases, Dec. 1993, pp. 914–925.

R. Agrawal et al., "Fast Algorithms for Mining Association Rules", Proc. of the VLDB Conference, Santiago, Chile, Sep. 1994, pp. 487–499.

R. Agrawal et al., "Mining Sequential Patterns", Proc. of the International Conference on Data Engineering, Mar. 1995, pp. 3–14.

(List continued on next page.)

*Primary Examiner*—Paul R. Lintz
*Attorney, Agent, or Firm*—Khanh Q. Tran

[57] ABSTRACT

A method is disclosed for determining the correlation among data sets having a numerical attribute and a 0–1 attribute. First, a numerical attribute is divided into a plurality of buckets, and each data set is placed into a single bucket according to the value of the numerical attribute. The number of data sets in each bucket and the number of data sets with a 0–1 attribute of 1 are counted. Second, an axis corresponding to the total number of data sets in a first through a particular buckets (X axis) and an axis corresponding to the total number of data sets with a 0–1 attribute of 1 in a first through a particular buckets (Y axis) are virtually established, and points corresponding to the respective values of the first through the particular buckets are virtually plotted. Third, after a plane is constructed in this manner, one of the pairs of points separated at an interval of T×N or T or larger which has the largest slope is found. This step is most important to fast processing, and this invention employs the nature of convex hulls to reduce the number of points to be considered. Finally, once this pair of points has been determined, the corresponding pair of buckets can be determined, resulting in the output of the corresponding segment. Also, once this process has been finished, the user can retrieve the required part of the data included in this section.

15 Claims, 12 Drawing Sheets

OTHER PUBLICATIONS

J. Han et al., "Discovery of Multiple–level Association Rules from Large Databases", Proc. of the VLDB Conference, Zurich, Switzerland, Sep. 1995, pp. 420–431.

M. Houtsma et al., "Set–oriented Mining for Association Rules in Relational Databases", Proc. of the 11th Conference on Data Engineering, 1995, pp. 25–33.

H. Mannila et al., "Improved Methods for Finding Association Rules", Pub. No. C–1993–65, University of Helsinki, 1993.

J.S. Park et al., "An Effective Hash–based Algorithm for Mining Association Rules", Proc. of the ACM SIGMOD Conference on Management of Data, San Jose, California, May 1995, pp. 175–186.

A. Savasere et al., "An Efficient Algorithm for Mining Association Rules in Large Databases", Proc. of the 21st VLDB Conference, Zurich, Switzerland, Sep. 1995, pp. 432–444.

G. P. Shapiro, "Discovery, Analysis, and Presentation of Strong Rules", Knowledge Discovery in Databases, AAAI/MIT Press, Menlo Park, California, 1991, pp. 229–248.

|  | $B_1$ | $B_2$ | $B_3$ | $B_4$ |  | $B_M$ |
|---|---|---|---|---|---|---|
| Number of data sets | $U_1$ | $U_2$ | $U_3$ | $U_4$ | ⋯ | $U_M$ |
| Number of data sets that meet condition | $V_1$ | $V_2$ | $V_3$ | $V_4$ |  | $V_M$ |

METHOD AND APPARATUS FOR DERIVING AN OPTIMIZED CONFIDENCE RULE

FIELD OF THE INVENTION

The present invention relates to an analysis of the correlation among data sets in a database, particularly to a method for deriving the correlation among data sets having a numerical attribute and a 0–1 attribute.

BACKGROUND OF THE INVENTION

Analyzing the correlation among data sets in a database to discover a significant association rule among attributes is called "data mining."

The fact that a customer has purchased a commodity A or has a credit card can be considered as data with a 0–1 attribute which can be indicated by 1 or 0. The values 1 and 0 represent, respectively, whether or not the customer has purchased a commodity A (or whether or not the customer has a credit card in the case of the credit card example). Attempts have been made to determine a rule from the correlation based on the 0–1 attribute. For example, R. Agrawal, T. Imielinski and A. Swami, in "Mining association rules between sets of items in large databases," Proceedings of the ACM SIGMOD Conference on Management of data, May 1993, and R. Agrawal and R. Srikant, in "Fast algorithms for mining association rules," Proceedings of the 20th VLDB Conference, 1994, describe methods for determining an association rule indicating that "a ratio r of the customers who have purchased a commodity A have also purchased a commodity B."

In conventional relational databases, their query languages can be used to provide a numerical attribute A and an interval I in order to easily determine X in, for example, the question that "X% of the data with A the value of which is included in I has a 0–1 attribute B." In this case, however, the interval I must be input. Current database systems do not have a function for outputting the interval I. This is because the association rule between the numerical attribute and a set of intervals based on the numerical attribute and the 0–1 attribute has a very large searching space.

For example, given a database for data on bank customers, it is very useful to be able to determine an interval I that meets an association rule for a combination of a numerical attribute (e.g., an increase in the amount of a fixed deposit) and an 0–1 attribute (e.g., whether or not a credit card is used). The association rule may then be used for determining, for example, a percentage X of those customers whose increase in the balance of a fixed deposit is included in the interval I use a credit card. There are many intervals I that meet this association rule depending on the minimum range of X or the interval I. However, if this association rule is modified to the rule that customers whose increase in the balance of a fixed deposit is included in the interval I, that includes T% or more of all the customers, are most likely to have a credit card, then the interval I can be substantially uniquely determined. The determination of the interval I is very useful because the largest class of customers who use a credit card can be determined so that the number of direct mails to be sent can be kept to a minimum. Thus, advertizing costs are minimized.

The above inquiries are also applicable to databases with a large number of data sets, so it is essential to be able to process such a large number of data sets in practical time.

It is thus an objective of this invention to enable the determination of the correlation among data sets with a numerical attribute and a 0–1 attribute.

It is another objective of this invention to execute the above processing at a high speed.

It is yet another objective of this invention that if the rate of data sets with their numerical attribute z included in the interval I=[r1, r2] is defined as a support for the interval I, and the rate of data sets with their numerical attributes z included in the interval I which have a 0–1 attribute (a) of 1 is defined as a degree of confidence, then the interval I with both a maximum degree of confidence and a support of T or larger can be determined. This interval I is referred to as an optimized confidence rule.

SUMMARY OF THE INVENTION

The invention can be divided into the following four sections.

(1) A numerical attribute is divided into a plurality of intervals (buckets), and each data set is placed into a single bucket according to the value of the numerical attribute. The number of data sets in each bucket and the number of data sets with a 0–1 attribute being 1 are counted.

(2) An axis (x axis), corresponding to the total number of data sets included in the first bucket through a particular bucket, and an axis (y axis), corresponding to the total number of data sets with a 0–1 attribute being 1 in the first bucket through a particular bucket, are virtually established. Points corresponding to the respective value set of the first through the particular buckets are virtually plotted. "Virtually" herein means that these elements are not necessarily actually displayed on a display or other device.

(3) After the plane is constructed in this manner, one of the pairs of points separated at an interval of T×N, or larger, which has the largest slope is searched. This step is the most important to fast processing, and this invention employs the nature of convex hulls to reduce the number of points to be considered.

(4) Once this pair of points has been determined, the corresponding pair of buckets can be determined, resulting in the output of the corresponding interval. Once this process has been finished, the user can retrieve the required part of the data belonging to this interval.

In short, in a database having N data sets, each including a numerical attribute and a 0–1 attribute, this invention provides a method for deriving an optimized confidence rule from computing an interval of the numerical attribute. In the interval, the probability of the 0–1 attribute being 1 is the largest and a predetermined ratio T or more of the N data sets exists. This method includes the of: (a) counting the number of data sets included in each bucket which is arranged along an axis corresponding to the numerical attribute, and counting the number of data sets included in each bucket, whose 0–1 attributes are 1; (b) virtually constructing a plane using a first axis corresponding to the first total number of data sets included up to each bucket and a second axis corresponding to the second total number of data sets included up to each bucket whose 0–1 attributes are 1, and virtually plotting on the plane each point corresponding to each value set of the first and second total numbers; (c) extracting a pair of points whose distance is equal to or more than T×N in the direction of the first axis, whose connection line has the largest slope; and (d) outputting the interval corresponding to buckets between the pair of points. This enables an optimized confidence rule to be determined.

It is also conceivable that each bucket is set so as to include a substantially identical number of data sets.

It is also conceivable that the fast counting step, with the substantially identical of data sets in each bucket, includes the steps of: (a) randomly sampling X of the N data sets; (b) sorting the X data sets according to the value of the numerical attribute; (c) holding the value of the numerical attribute of the i×X/M-th (i=1, 2, . . . , M−1; M is the number of buckets) of the sorted data sets; and (d) counting the number of data sets included in each data set, based on the held value.

It is also conceivable that the extracting step includes the steps of: (a) virtually creating a lower part of a plurality of convex hulls by sequentially connecting the plotted points together from the left of the first axis; (b) virtually creating an upper part of a plurality of convex hulls by sequentially connecting the plotted points together from the right of the first axis; (c) detecting inner tangents between one of the lower convex hulls and one of the upper convex hulls, the leftmost end of which is the point spaced T×N in the direction of the first axis apart from the rightmost end of the one of lower convex hulls, the inner tangents having the largest slope; and (d) selecting one of the pairs of points constituting a plurality of detected inner tangents. The inner tangent of the one of the pairs has the largest slope in the detected inner tangents. This enables the fast processing described above.

In another aspect of the invention, in a database having data sets each including a numerical attribute and a 0–1 attribute, the invention provides a method for deriving an optimized confidence rule from computing an interval of the numerical attribute. In the interval, the probability of the 0–1 attribute being 1 is the largest and predetermined B or more data sets are included. This method includes the steps of: (a) counting the number of data sets included in each bucket which is arranged along an axis corresponding to the numerical attribute, and counting the number of those data sets included in each bucket, whose 0–1 attributes are 1; (b) virtually constructing a plane using a first axis corresponding to a first total number of data sets included in a first bucket through a particular bucket and a second axis corresponding to the total number of data sets included in a first bucket through a particular bucket whose 0–1 attributes are 1, and virtually plotting on the plane each point corresponding to each value set of the first and second total numbers; (c) extracting a pair of points spaced an interval of B or larger in the direction of the first axis apart, whose connection line has the largest slope; and (d) outputting the interval corresponding to buckets between the pair of points. The condition to be set may thus be the number of data sets. In this case, the more specific process as described above can also be used.

Another form of this invention that is typically conceivable is the implementation of the above method using an apparatus specially constructed, computer programs, or a medium that stores such computer programs.

DESCRIPTION OF THE PREFERRED EMBODIMENT

The method steps of the present invention are now described in detail.

1. Bucket processing

A particular range of the value of a numerical attribute of data set is partitioned into buckets, which can be expressed as $B_1, B_2, B_3, \ldots, B_M$, where $B_i=[x_i, y_i]$, $x_i \leq y_i < x_{i+1}$). The value of the numerical attribute of data set is included in one of the buckets. $B_i=[x, x]$ may be used if high resolution is required.

It is conceivable that all the data sets are sorted according to their numerical attributes in order to examine which bucket should contain each data set. If, however, such processing is to be executed and the database contains a very large number of data sets, they cannot be processed within the computer main memory, resulting in a failure to finish the process in practical time. The following process is thus required.

It is assumed that there are N data sets and that they are to be put into M buckets. It is also assumed that the i-th bucket cannot be put into the (i+1)-th bucket.

Figure 1:
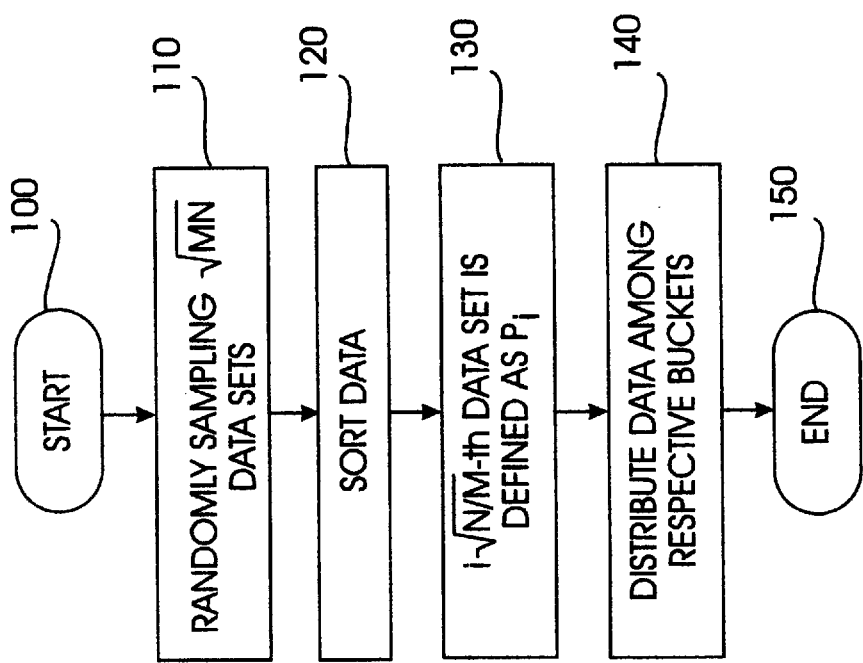
FIG. 1 is a flowchart showing the bucket processing steps.

(a) $(M \times N)^{0.5}$ data sets are randomly sampled from the entire data set (step 110 in FIG. 1). For example, if M is about 1,000 and N is about one billion, then $(M \times N)^{0.5}$ is about one million. This process can be performed in the main memory of the computer.

(b) The randomly sampled data is sorted (step 120). Calculations can be carried out in the order of $O((M \times N)^{0.5} \times \log (M \times N))$.

(c) The $i(N/M)^{0.5}$-th value is stored as $p_i$ (step 130). In this case, $p_o = -\infty$ and $p_M = \infty$.

(d) The data sets are put into different buckets (step 140). A bucket $B_i$ contains a data set with x corresponding to $p_i < x \leq p_i + 1$. This step can be executed in the order of $O(N \log M)$ using binary search. At the same time, the number of data sets in each bucket and the number of data sets with a 0–1 attribute being 1 are counted.

With the above method, the data can be generally processed in the order of $O(N \log M)$. In addition, if the number of data sets to be sampled is $(M \times N)^{0.5}$, it is very likely that the number of errors can be reduced from $M/2N$ to $2M/N$.

Figure 2:
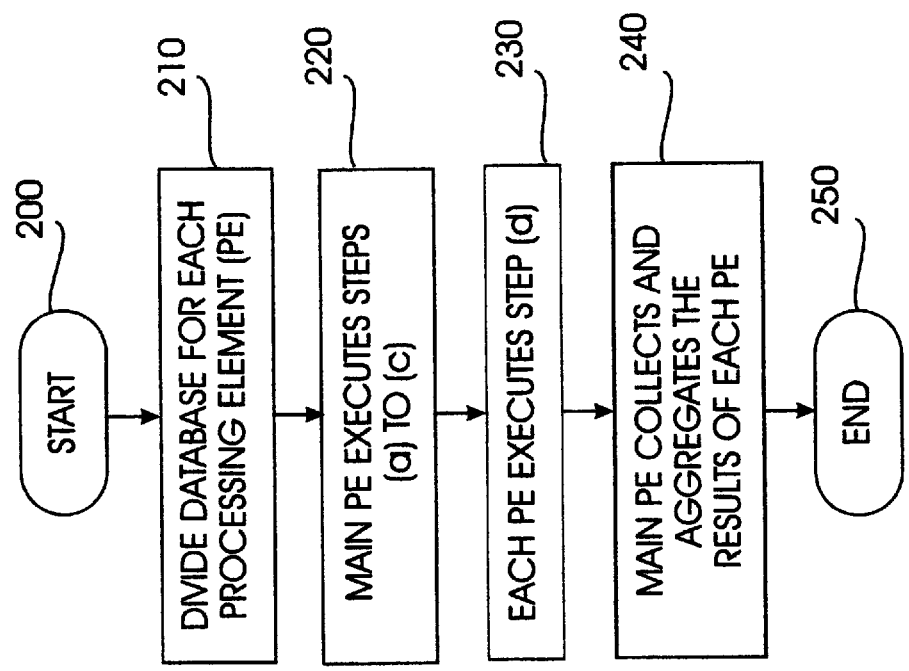
FIG. 2 is a flowchart showing the use of a plurality of processor elements for the bucket processing.

Although step (d) takes the largest amount of time, parallel processing can be used to easily reduce the amount of time. That is, the data of the database is divided into the processor elements (as shown by step 210 of FIG. 2). A main processor element carries out steps (a) to (c) (as shown by step 220 of FIG. 2). Each of the other processor elements executes step (d) (shown by step 230 of FIG. 2). The main processor element collects and aggregates the results from each of the other processor elements (step 240 of FIG. 2). This method reduces the amount of data communication among the processor elements, and also reduces the amount of processing time due to the parallel processing of step (d) that is subjected to substantial loads.

In this manner, the initial processing of the buckets is completed.

2. Plane construction

Once the buckets have been prepared as described above, consecutive buckets with T or larger support and a maximum degree of confidence are retrieved. The buckets are referred to as $B_1, B_2, B_3, \ldots, B_M$, and the number of data sets in each bucket is $u_i$ (i=1, 2, ..., M) and the number of data sets required to meet a condition is $v_i$ (i=1, 2, ..., M)). Support (s, t) is a support for $x_s \leq A \leq y_t$, where A represents the attribute of data set. It is actually the number of data sets in a set of consecutive buckets $B_s, B_{s+1}, B_{s+2}, \ldots, B_t$ divided by the total number of data sets N, and can be expressed as follows:

$$\text{Support}(s, t) = \sum_{i=s}^{t} u_i / N \qquad (1)$$

Conf (s, t) is a confidence for $x_s \leq A \leq y_t$ which meets a condition C. It can be expressed as follows:

$$\text{Conf}(s, t) = \sum_{i=s}^{t} v_i / \sum_{i=s}^{t} u_i \qquad (2)$$

The objective of this invention is to determine s and t which provide T or larger support (s, t) and the largest conf (s, t).

$$Q_k = \left( \sum_{i=1}^{k} u_i, \sum_{i=1}^{k} v_i \right) \qquad (3)$$

To achieve this objective, a plane comprising two axes, (u) and (v) is assumed, and points $Q_k$ (k=1, 2, ..., M) are plotted on the plane. In this case, $Q_0$ is (0, 0).

3. Extraction of a pair of points with the largest slope

It is easily understandable that on the above plane, the slope of a line $Q_m Q_n$ constitutes conf (m+1, n). Consequently, as described above, an objective of this invention is to meet a condition in which m<n and support (m+1, n)$\geq$T and in which conf (m+1, n) is the largest. That is, to find $Q_m$ and $Q_n$ with an interval therebetween of N×T or larger and the largest slope of the line $Q_m Q_n$.

If a plurality of lines $Q_m Q_n$ have the same slope, one of them with the largest width between $Q_m$ and $Q_n$ shall be selected.

Figures 3, 4:
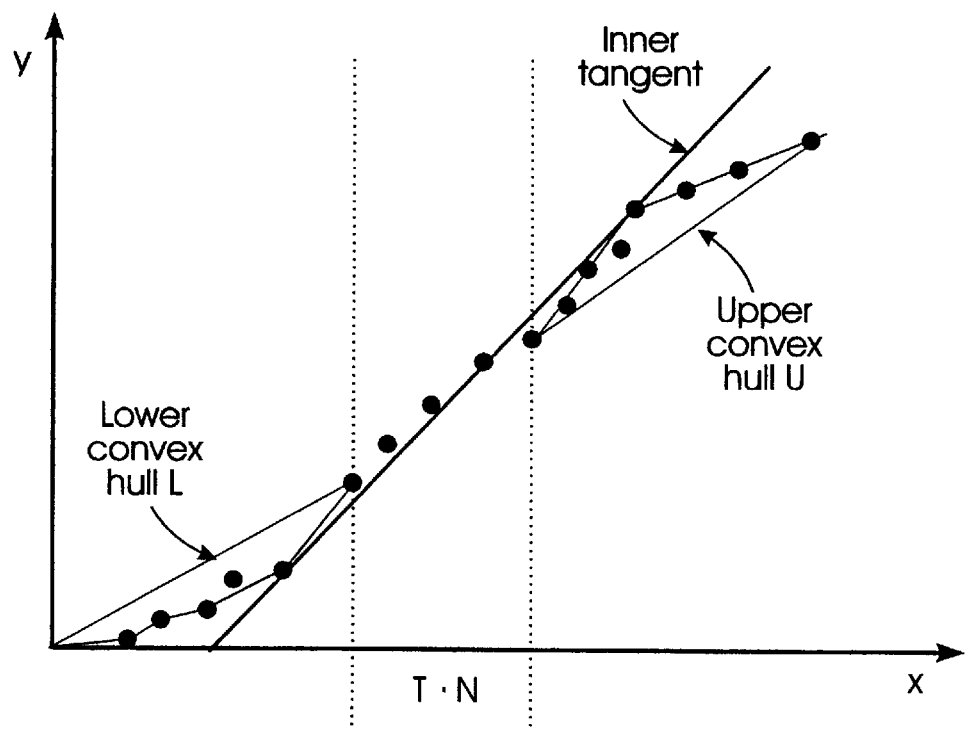
FIG. 3 is a drawing showing the state of the buckets after the bucket processing has ended.
FIG. 4 shows an example of a convex hull.

Methods that can be used to solve this problem are described below. It is first assumed that two convex hulls are created. That is, $Q_i$ lines are connected together to produce convex hulls L and U that are convex and spaced at an interval of at least T×N. Two certain points on one of the inner tangents between the convex hulls which has the largest slope should be determined. FIG. 4 illustrates this concept. For simplification, the two axes are denoted by x and y. The convex hulls are used to reduce the number of required calculations, based on the fact that those points inside the convex hull which do not constitute the frame of the hull never have the largest slope (conf (m+1, n)). Also, a larger number of points on the frame of the convex hull need not be computed despite their location on the frame of the hull due to the characteristics of the convex hull. For example, once a detected slope has started to decrease, it no longer increases. Since the largest slope is required, the data in the upper part of the convex hull L and in the lower part of the convex hull U need not be held as shown in FIG. 4. Thus, as described below, in step (A), the lower part of the convex hull L is examined. In step (B), the upper part of the convex hull U is examined. In step (C), one of the inner tangents between these two parts which has the largest slope is found.

(A) Step for detecting and holding the lower part of the convex hull L

Figure 5:
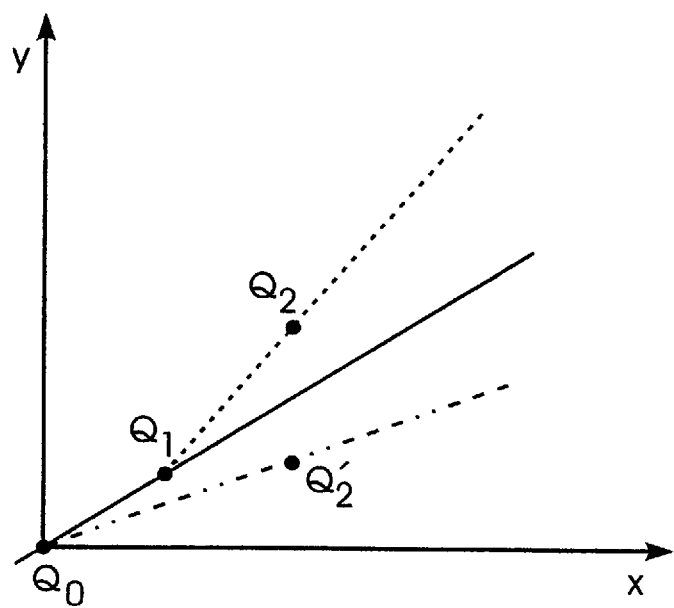
FIGS. 5 and 6 show the steps for creating a lower convex hull L.

The convex hull L can be considered as a set of $Q_i$ lines. The convex hull L from $Q_0$ through $Q_m$ is referred to as $L_m$ and expressed as $\{Q_0, \ldots, Q_m\}$. First, FIG. 5 is referenced. This figure shows a process for creating the convex hull L from $Q_0$. $Q_0$ and $Q_1$ can be connected together by simple connection, but attention must be paid to $Q_2$. That is, it must be considered whether or not $Q_1$ and $Q_2$ may be connected together. When a convex hull is created, $Q_1$ and $Q_2$ can be connected together without problems as long as $Q_2$ is located above a line $Q_0 Q_1$. If, however, $Q_2$ is located below the line $Q_0 Q_1$, simply connecting $Q_0$, $Q_1$, and $Q_2$ together does not result in a downward convex. Thus, in this case, $Q_1$ is removed, and $Q_0$ and $Q_2$ are connected together to form a convex hull $L_2$ $\{Q_0, Q_2\}$.

Figure 6:
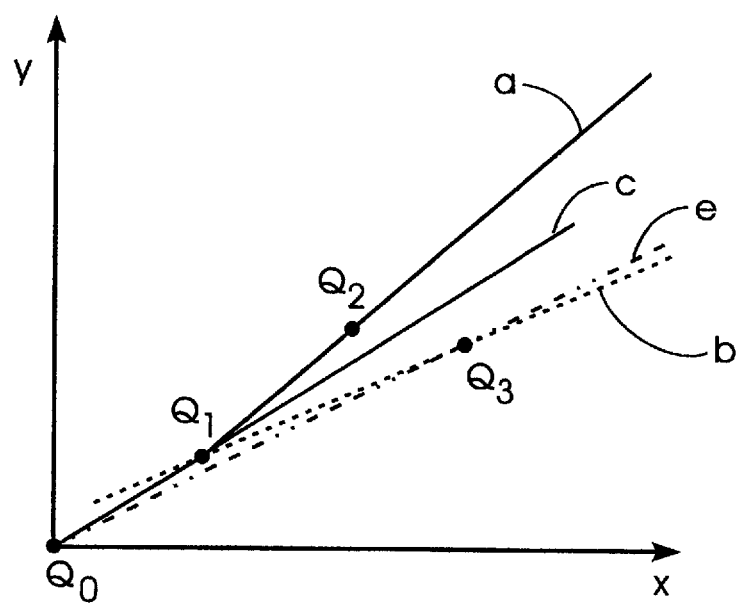

The condition shown in FIG. 6 must be considered. In this case, $Q_0$, $Q_1$, and $Q_2$ can be simply connected together according to the rule described above. That is, $L_2$ $\{Q_0, Q_1, Q_2\}$ is formed. When $L_3$ is considered, however, it is easily understandable that $Q_2$ and $Q_3$ cannot be connected together ($Q_3$ is located below a line (a) between $Q_1$ and $Q_2$), but a line (b) cannot be established between $Q_1$ and $Q_3$ because $Q_3$ is located below a line (c) between $Q_0$ and $Q_1$. Thus, a line (e) is established between $Q_0$ and $Q_3$.

Figure 7:
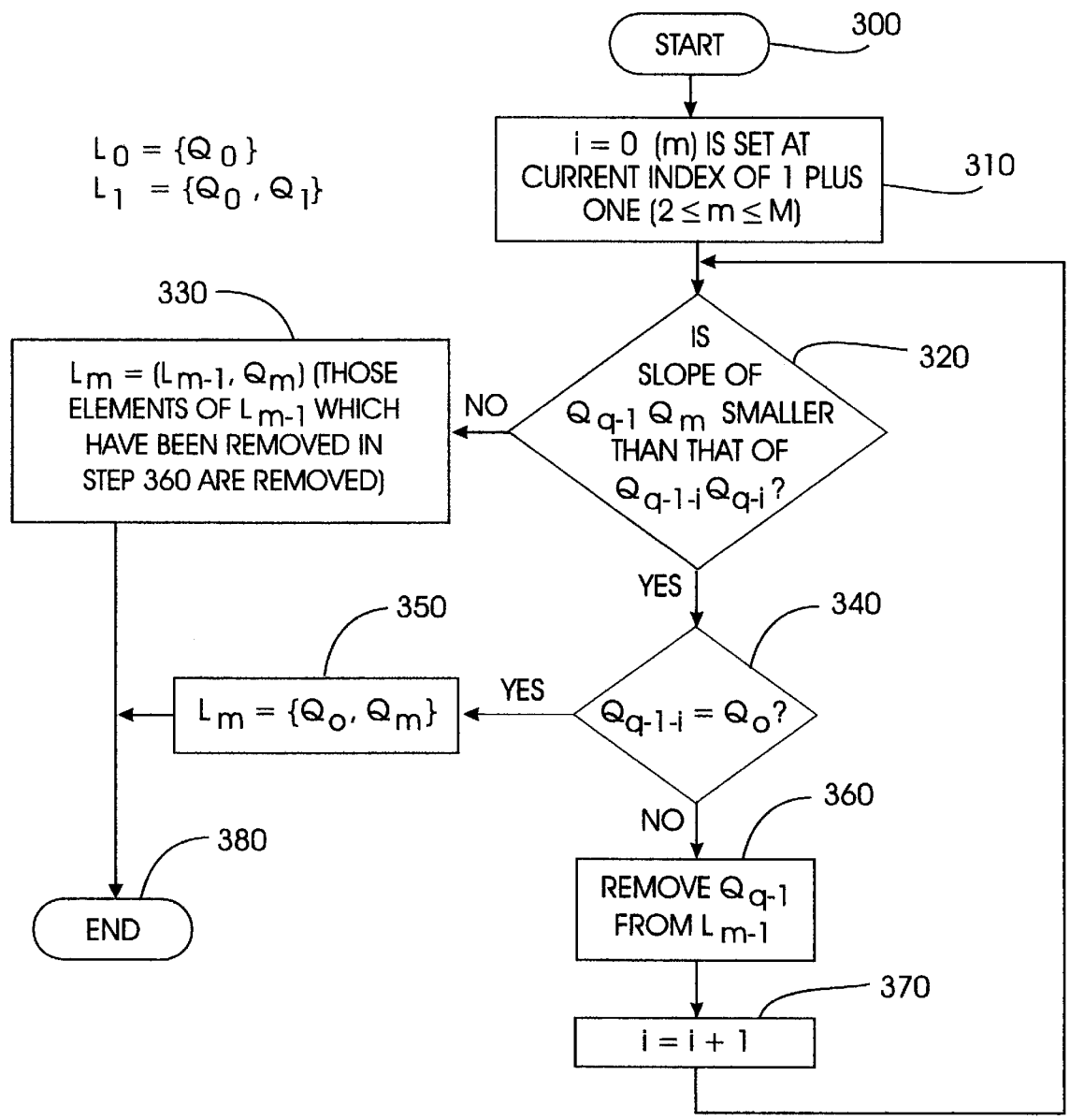
FIG. 7 is a flowchart showing a process for creating the lower convex hull L.

Thus, an accurate convex hull may not be always held by using a newly added point and a preceding line that constitutes part of the convex hull, so the following steps are sometimes required (see FIG. 7). In this case, $L_{m-1}$ = $\{Q_0, \ldots Q_{q-1}, Q_q\}$ $Q_q$ is the leftmost point of $L_{m-1}$, and index q is decremented in subsequent steps, but not mathematically. That is, $Q_q$ depicts a point Q that is included in $L_{m-1}$ in which this point sequentially shifts leftward on the xy plane. Referring to FIG. 7, the process starts with step 300. In step 310, initialization is carried out to set i=0 and an input for m is received, where m is the current index of L plus 1 (2$\leq$m$\leq$M). The slope of the connection line $Q_{q-i} Q_m$ between the i-th point $Q_{q-i}$ from the rightmost point $Q_q$ of $L_{m-1}$ and $Q_m$ is compared to that of the connection line $Q_{q-1-i} Q_{q-1}$ between the i-th point $Q_{q-1-i}$ from the second rightmost point $Q_{q-1}$ of $L_{m-1}$ and the i-th point $Q_{q-1}$ from the rightmost point $Q_q$ (step 320). If the former is larger than the latter, the process is ended with $L_m = \{L_{m-1}, Q_m\}$ (steps 330 and 380). If $Q_{q-i}$ that is not included in the convex hull $L_m$ of $Q_m$ is removed in step 360, $L_{m-1}$ does not include the removed $Q_{q-i}$. If, however, the former is smaller than the latter in step 320, $Q_{q-1-i} = Q_0$ in some cases, so this matter is first considered (step 340). If $Q_{q-1-i} = Q_0$, simply connecting $Q_0$ and $Q_m$ together forms a convex hull, so the process is ended with Lm=$\{Q_0, Q_m\}$ (steps 350 and 380). If $Q_{q-1-i}$ is not $Q_0$, however, $Q_{q-1}$ is removed from $L_{m-1}$ that is used to create $L_m$ because it has been found that this point cannot be included in $L_m$ (step 360). The value of i is incremented by one, and the process returns to step 320 (step 370). This process the convex hull $L_m$ to be sequentially detected and held for any m of three or larger.

(B) Step for holding the upper part of the convex hull U

Figures 8, 9:
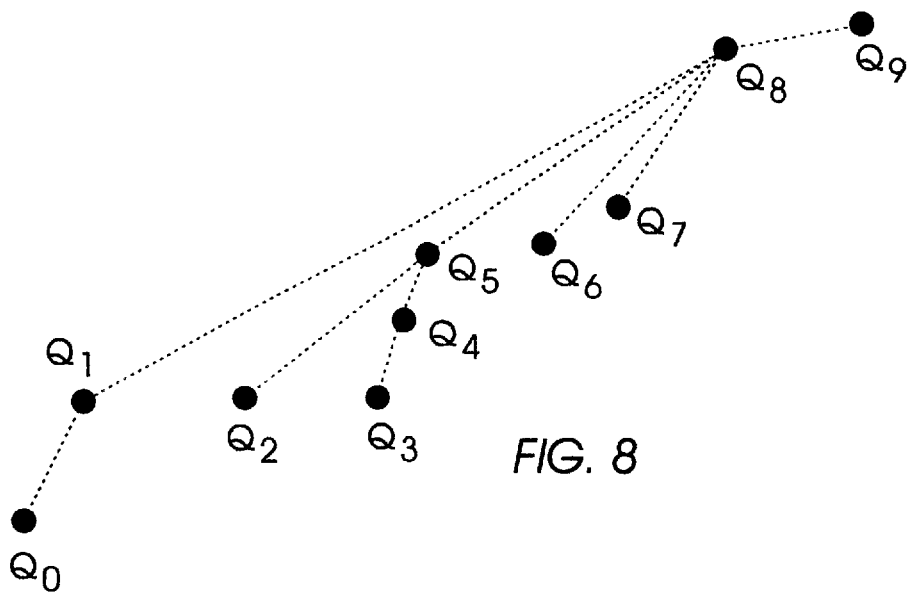
FIG. 8 illustrates an upper convex hull U.
FIG. 9 shows the transition of the states of stacks required for the process in FIG. 7.

The example of FIG. 8 is first considered. There are 10 points from $Q_0$ to $Q_9$, and these points are processed from the right. A single stack and a single stack array are prepared, and used to create and hold $U_m$. Processing from the right means that the processing sequentially proceeds from $Q_9$ through $Q_0$. Two points called a "top" and a "second" are established. The top is generally the leftmost point of $U_{m-1}$, and is given as a function Top ($U_{m-1}$). If, however, any points including the leftmost point have been removed from $U_{m-1}$, the point located to the right of the previous leftmost point at an interval corresponding to the removed points (which belongs to $U_{m-1}$) will become the top. Specifically, the top is the uppermost point in the stack. Likewise, the second is generally the second leftmost point of $U_{m-1}$, and is given as Second ($U_{m-1}$). As in the top, if any point has been removed, the point next to the point to be the top on the right side (which belongs to $U_{m-1}$) will become the second. Specifically, the second uppermost point in the stack will be the second.

FIG. 8 shows that $U_8$ is initially composed of $Q_9$ and $Q_8$. $Q_9$ and $Q_8$ are thus pushed into the stack (a) of FIG. 9. Since the constitution of $U_7$ is subsequently considered, the position of $Q_7$ is checked. Then, the uppermost point $Q_8$ in the stack is the top, and the point $Q_9$ immediately below $Q_8$ is the second. $Q_7$ $Q_8$, that is, the slope of the line between the top and the second is compared to $Q_8Q_9$, that is, the slope of the line between the newly added point and the top. It is then found that $Q_7Q_8$ has a larger slope. In this case, the new point $Q_7$ is pushed into the stack (b) of FIG. 9. The stack array (FIG. 10) is used to record points that have been removed from the preceding stack when i is decremented by one. No point has been removed when i has become 7 from 8. That is, when $U_7$ has been determined from $U_8$, nothing is pushed. Although in this example, there are only ten points, a huge amount of data must be generally used, so U is not always held. Only the initial U (in this case, $U_0$) and the stack array, however, are held to create an arbitrary U as required.

Next, addition of $Q_6$ is considered. The abovementioned top and second are the uppermost and the second uppermost points $Q_7$ and $Q_8$, respectively, in the stack (b) of FIG. 9. The slopes of $Q_6Q_7$ and $Q_7Q_8$ are determined and compared. It is then found that $Q_7Q_8$ has a larger slope. Thus, simply connecting $Q_6$ and $Q_7$ together does not result in the formation of a convex hull. The top, that is, $Q_7$ is then popped from the stack and removed from $U_6$. As described above, since the stack array is used to contain removed points, $Q_7$ is pushed into the i=6 section of the stack array ($D_6$ in FIG. 10). $Q_8$ becomes the uppermost point in the stack, that is, the top. In addition, $Q_9$ becomes the second uppermost point becomes, that is, the second. A check is again conducted, that is, the slopes of $Q_6Q_8$ and $Q_8$ $Q_9$ are examined and compared. It is then found that $Q_6$ $Q_8$ has a larger slope, so $U_6$ is composed of $Q_6$, $Q_8$, and $Q_9$. $Q_6$ is thus pushed into the stack (c) of FIG. 9.

Likewise, $U_5$ is calculated. The position of $Q_5$ is then found to be as in $U_6$. $Q_6$ is popped from and $Q_5$ is pushed into the stack (d) of FIG. 9, respectively. $Q_6$ is pushed into the i=5 section of the stack array ($D_5$ in FIG. 10).

For $U_4$ and $U_3$, the process is ended after only the addition of $Q_4$ and $Q_3$ (which correspond to the stacks (e) and (f) of FIG. 9, respectively).

Next, $U_2$ is considered. In this case, the top is $Q_3$ and the second is $Q_4$. As described above, when the slope of $Q_2Q_3$ is compared to that of $Q_3Q_4$, it is found that the latter is larger. $Q_3$ is then popped from the stack (g) of FIG. 9, and pushed into the i=2 section of the stack array ($D_2$ in FIG. 10). Then, the top is $Q_4$, and the second is $Q_5$. Likewise, when the slope of $Q_2Q_4$ is compared to that of $Q_4Q_5$, it is again found that the latter is larger. $Q_4$ is then popped from the first stack (h) of FIG. 9, and pushed into the i=2 section of the stack array ($D_2$ in FIG. 10). Then, the top and the second change to $Q_5$ and $Q_8$, respectively. When the slope of $Q_2Q_5$ is compared to that of $Q_5Q_8$, it is found that the former is larger. The processing of $U_2$ is ended by pushing $Q_2$ into the first stack i of FIG. 9.

Figures 10, 11:
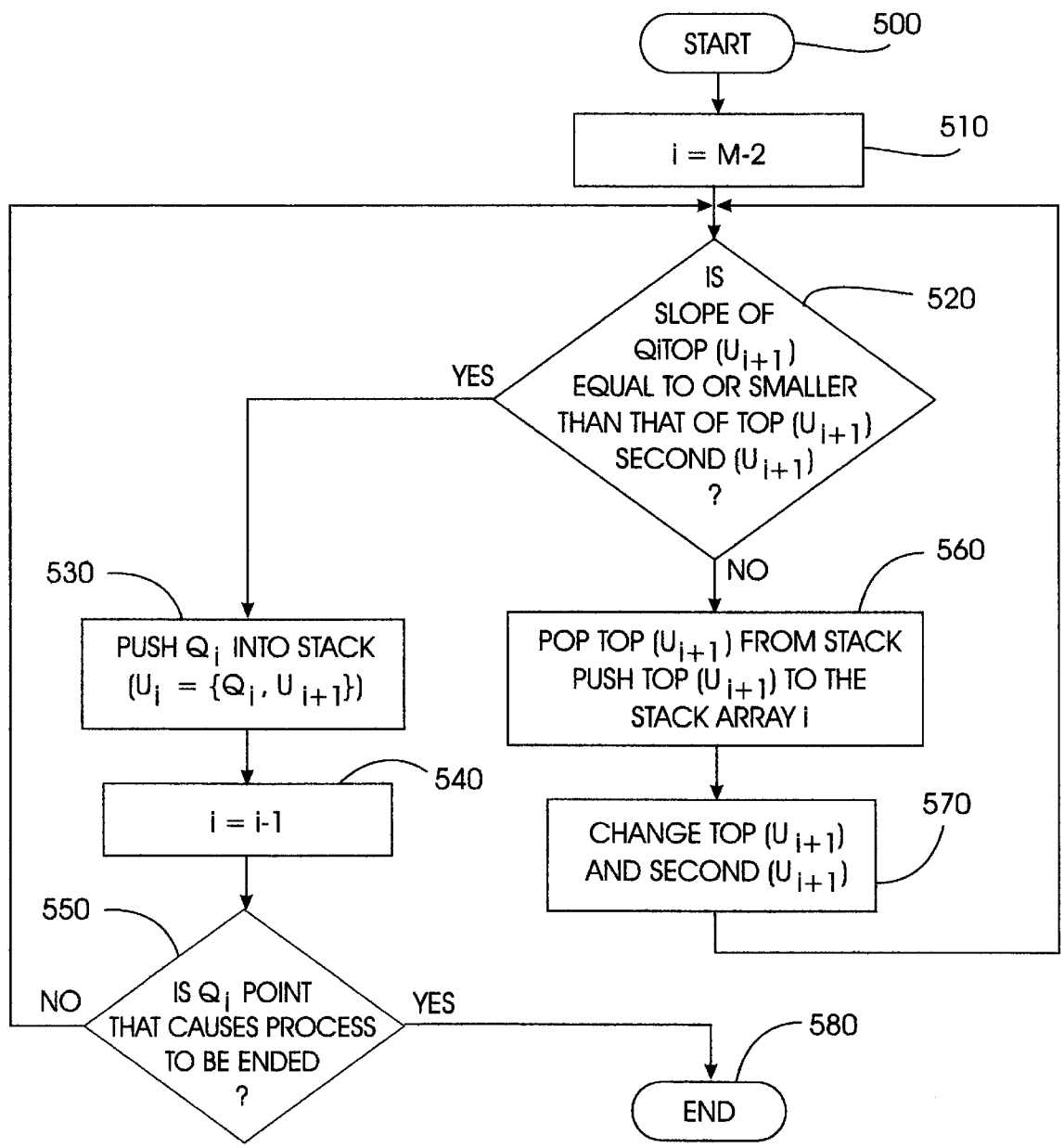
FIG. 10 shows a stack array.
FIG. 11 is a flowchart showing a process for creating the stacks initially and a stack array.

As in the case of $U_2$, $U_1$ is now calculated, resulting in $Q_1$, $Q_8$, and $Q_9$ being pushed into the stack (j) of FIG. 9, and $Q_2$ and $Q_5$ being pushed into the i=1 section of the stack array ($D_1$ in FIG. 10).

The processing of the last $U_0$ is ended after a single comparison, resulting in the set of points in $U_0$ shown in stack (k) of FIG. 9 and the stack array shown in FIG. 10.

In this manner, all the convex hulls are calculated during the process, but only the state of the stack $U_0$ and the stack array are retained. The state of the stack $U_0$ and the stack array can be used to calculate each U. For example, to calculate $U_1$, $Q_0$ is removed from $U_0$, and points stored in the i=0 section of the stack array are added. In this case, there is no point in this section, so $U_1$ is composed of the points shown in stack (j) of FIG. 9. To calculate $U_2$, $Q_1$ is removed from $U_1$, and $Q_2$ and $Q_5$ in the i=1 section of the stack array are added. This provides $U_2$ shown in stack i of FIG. 9. Likewise, to calculate $U_3$, $Q_2$ is removed from $U_2$, and $Q_3$ and $Q_4$ in the i=3 section of the stack array are added. The points shown in stack (f) of FIG. 9 then constitute $U_3$.

The repetition of such a process enables the x-y plane to be processed from right to left while reducing the load of processing from left to right which is actually required.

FIG. 11 illustrates this process. The process is initiated in step 500, and initialization is carried out in step 510 to set i=M−2. M is the number of points Q, and $Q_M$ and $Q_{M-1}$ have already been pushed into the stack. The slope of a line $Q_i$Top($U_{i+1}$) between $Q_i$ and Top($U_{i+1}$) is compared to that of a line between Top($U_{i+1}$) and Second($U_{i+1}$) (step 520). If the former is equal to or smaller than the latter, $Q_i$ is pushed into the stack in step 530, and i is decremented by one in step 540. It is then determined in step 550 whether or not $Q_i$ with the decremented i is the point at which the process should be ended. The convex hull $L_0$ is $Q_0$, but calculations are insignificant unless $Q_i$ is spaced an interval of T×N apart from $Q_0$. It is thus determined whether or not this condition is met. If so, the process is ended in step 580. Otherwise, a new $Q_i$ is processed in step 520.

If the slope of $Q_i$Top($U_{i+1}$) is large in step 520, Top($U_{i+1}$) is popped from the stack, and the popped Top($U_{+1}$) is pushed into the i section of the stack array in step 560. Then, the uppermost point in the stack is Top($U_{i+1}$), and the second uppermost point in the stack is Second($U_{i+1}$) in step 570. The top and the second are changed in this manner, and the process returns to step 520. This process is repeated until $Q_i$ where the process is to be ended is reached.

Figure 12:
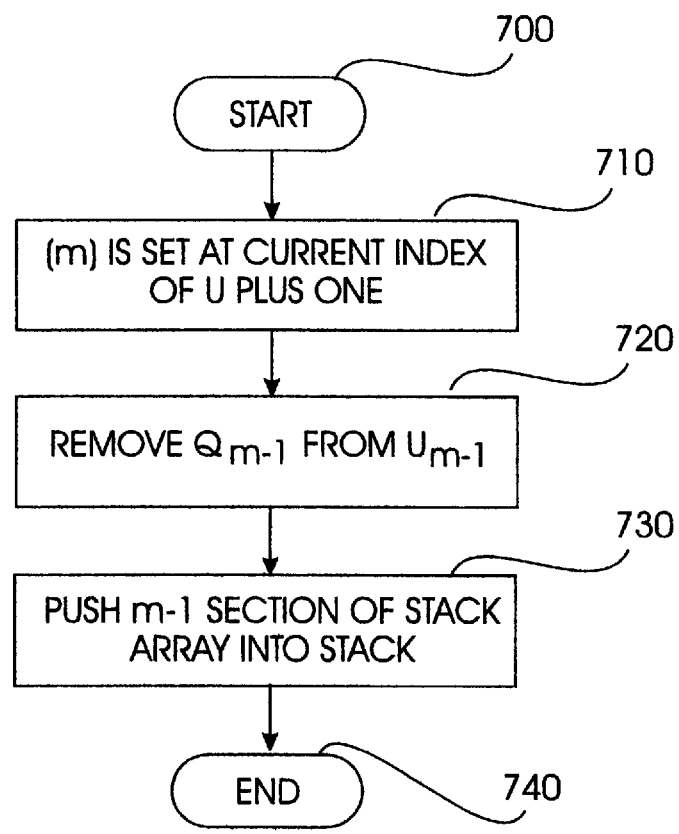
FIG. 12 is a flowchart showing a process for creating the convex hull U from the stack array and the stack.

This process requires calculations in O(M) (M is the number of points). FIG. 12 shows a method for determining $U_m$ with a certain m. In this case, $U_{m-1}$ and the stack array have already been prepared. The process is initiated in step 700, and m is set to the current index of U plus 1 in step 720. Since $U_{m-1}$ has already been prepared, $Q_{m-1}$ is removed from $U_{m-1}$ in step 720. Points in $D_{m-1}$, that is, the m−1 section of the stack array are pushed into the stack in step 730. $U_m$ is thus completed to end the process in step 740. This process requires only an order of O(1).

(C) Step for calculating an inner tangent.

The following method can be used to calculate the lower part of the convex hull L and the upper part of the convex hull U. The process then calculates an inner tangent with the largest slope. First, related notations are described. $U_{r(m)}$ is a point that is spaced an interval of N×T or larger apart from $Q_m$ and which has the smallest number. That is, if $U_{r(m)}=U_i$, then min $\{i|m<i, \text{support } (m+1, i) \geq T\}$.

The starting point of the convex hull L which is used to examine the slope is denoted by $Q_s$, and the point of the convex hull U which has the largest slope relative to the starting point $Q_s$ is referred to as $Q_t$.

First, $L_0$ is considered. $L_0$ is composed of only $Q_0$. Then, the upper convex hull is $U_{r(0)}$. The leftmost point of $U_{r(0)}$ is $Q_{r(0)}$. Since $L_0$ is composed of $Q_0$, naturally the starting point is $Q_0$ and $Q_0=Q_{s0}$.

Figure 13:
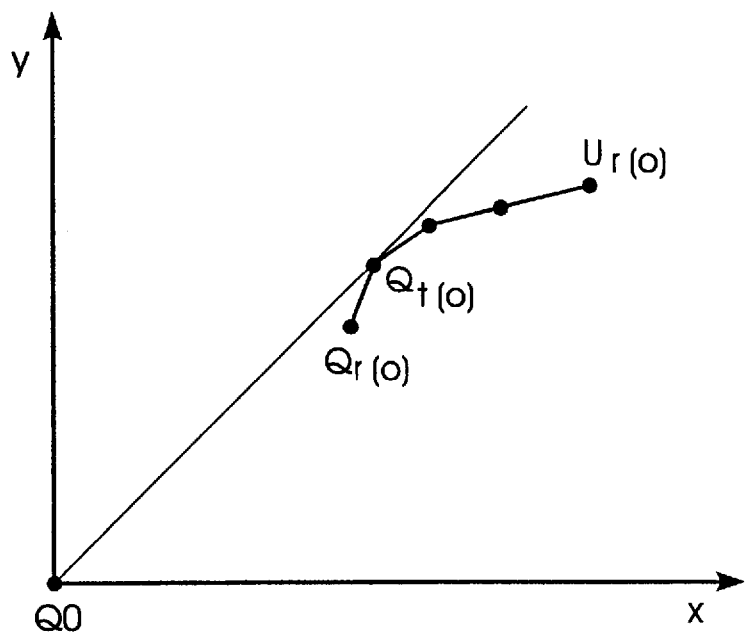
FIG. 13 illustrates an initial step for producing an inner tangent for the convex hulls L and U.

Using $Q_{s0}$ as the starting point, points are sequentially examined clockwise from $Q_{r(0)}$ to find a point with the largest slope. In this case, while confirming that the slope continues to increase, a point from which the slope starts to decrease is found, and the preceding point is determined as $Q_{t0}$. This operation can be performed because due to a characteristic of the convex hull, the slope no longer increases once it has started to decrease. The number of calculations is thus reduced. Due to another characteristic of the convex hull, U with an index of larger than r(0) need not be examined for a single $Q_s$. If the starting point is the same, points located to the left of the determined point $Q_t$ have a smaller value of y and thus a smaller slope. The points located to the right of $Q_t$ are included in $U_{r(m)}$ and cannot constitute a convex hull. The number of calculations is thus reduced. An example of this process is shown in FIG. 13. The two determined points are stored.

The general processing executed after a single $Q_{s0}$ $Q_{t0}$ has been determined is described below.

The processing of $L_m$ and $U_{r(m)}$ is first considered. In this case, $Q_{s(m-1)}Q_{t(m-1)}$ has been detected as an inner tangent with the largest slope during the processing of $L_{m-1}$ and $U_{r(m-1)}$.

Case 1:

Assume $t_{m-1}=r(m)-1$, that is $Q_{t(m-1)}$ is no longer included in $U_{r(m)}$ due to the incrementation of m by one. In this case, the process depends on whether $Q_m$ (the rightmost point of $L_m$) is located below an inner tangent $Q_{s(m-1)}Q_{t(m-1)}$ already determined (case 1a) or above this inner tangent (case 1b).

Figure 14:
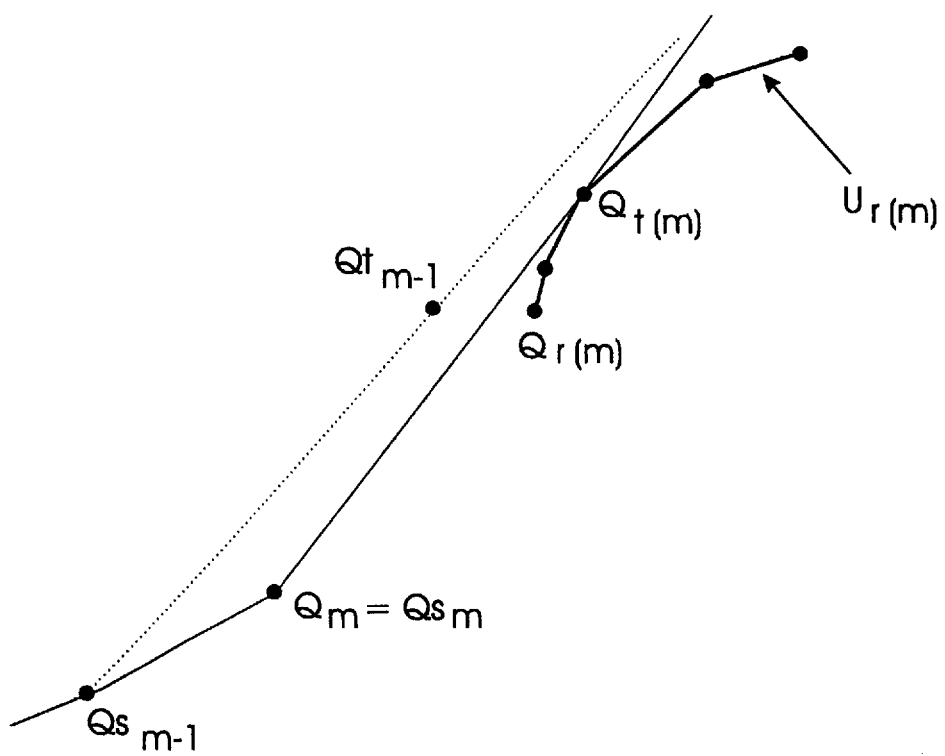
FIG. 14 illustrates an example of the processing for case 1 referred to in the detail description section.

In the case of (1a), using $Q_m$ as the starting point, the slope is sequentially detected clockwise from $Q_{r(m)}$. The point preceding to the point from which the slope starts to decrease is determined as $Q_{tm}$. This process is similar to that for $Q_0$, and no further processing is required. An example of this process is shown in FIG. 14. In the case of (1b), the starting point is $Q_{s(m-1)}$. The slope is sequentially detected clockwise from $Q_{r(m)}$. Subsequent processing is carried out as in (1a).

Case 2:

In this case, $r(m) \leq t_{m-1}$, that is, $Q_{t(m-1)}$ remains included in $U_{r(m)}$ despite the incrementation of m by one. Again, the process depends on whether $Q_m$ is located below inner tangent $Q_{s(m-1)}Q_{t(m-1)}$ already determined (case 2a) or above this inner tangent (case 2b).

Figure 15:
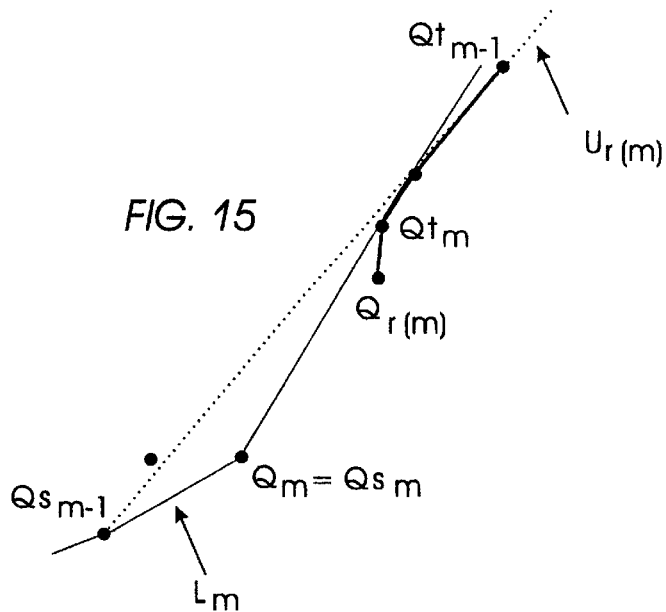
FIG. 15 shows part of the processing for case 2 referred to in the detail description section.

In the case of (2a), no further processing is required because an inner tangent $Q_{s(m-1)}Q_{t(m-1)}$ already determined has the largest slope. In the case of (2b), the starting point is set as $Q_m$, and for $U_{r(m)}$, searching is executed counter-clockwise from $Q_{t(m-1)}$. While the slope continues to increase, the slope for the next point is calculated. When the slope starts to decrease, the preceding point is determined as $Q_{tm}$. This process is shown in FIG. 15.

The repetition of this process from m =1 until m =M enables a pair of points with the largest slope to be determined in each pair of $L_m$ and $U_{r(m)}$. The solution will then be one of the pairs of points which has the largest value.

Figure 16:
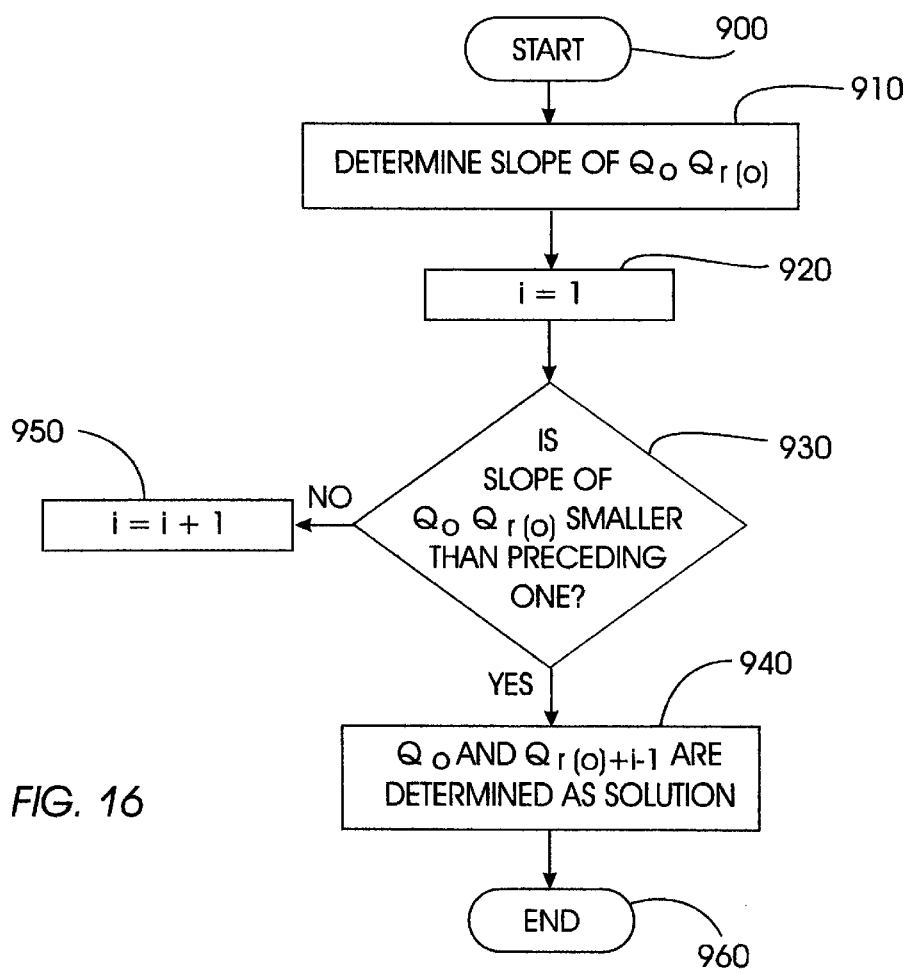
FIG. 16 is a flowchart showing the processing for case 1 referred to in the detail description section.
Figure 17:
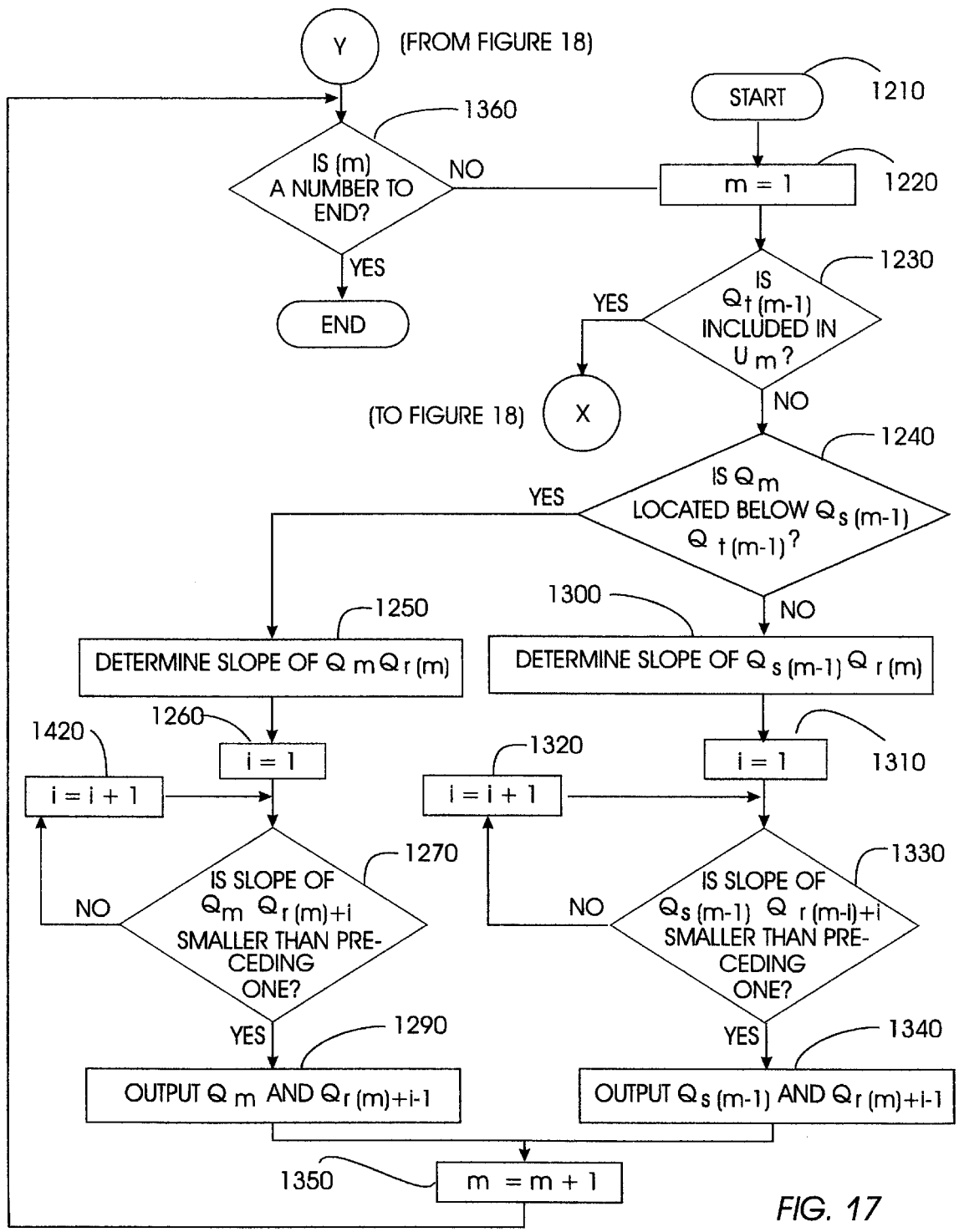
FIG. 17 is a flowchart showing the processing for case 2 referred to in the detail description section.
Figure 18:
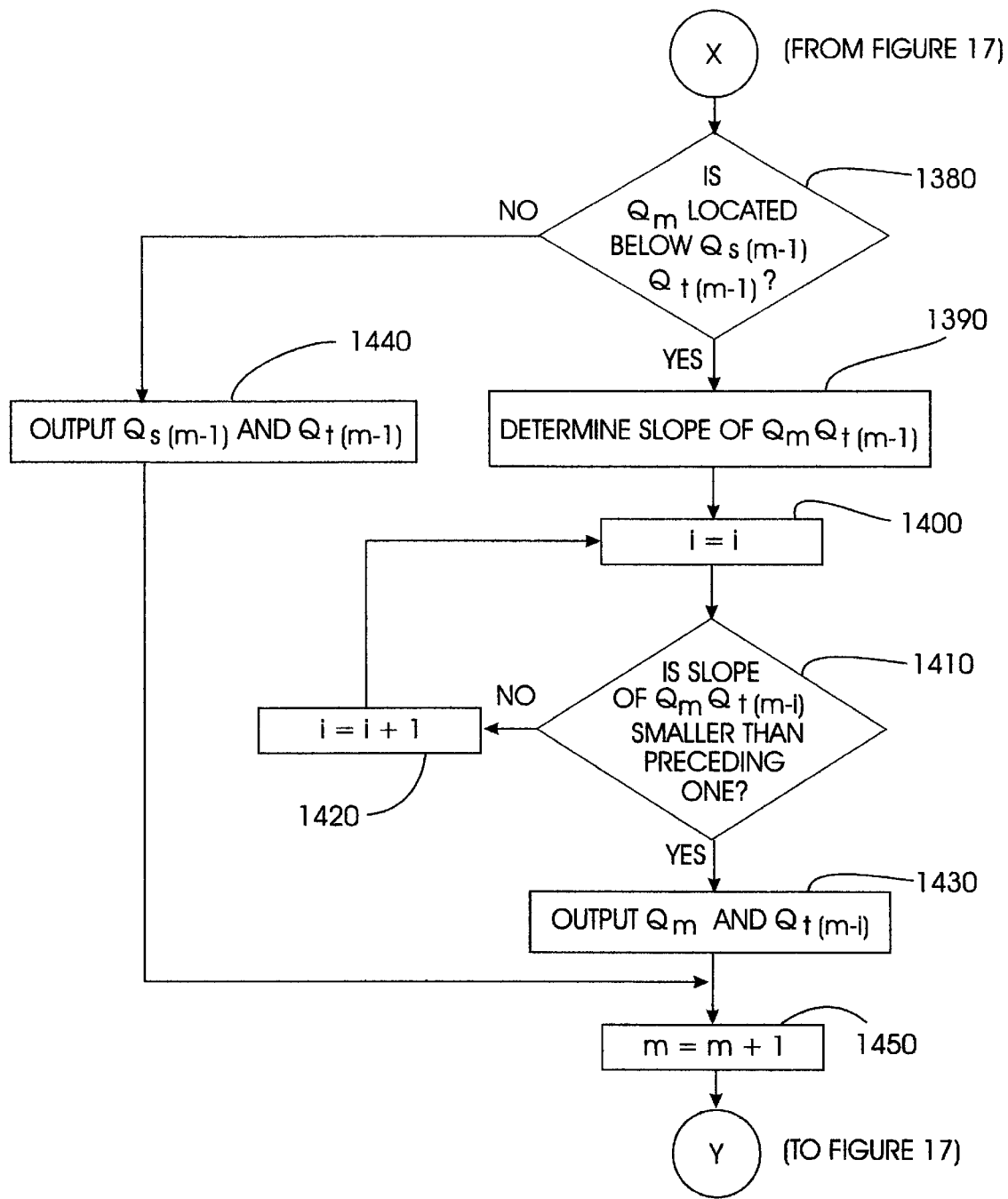
FIG. 18 is a flowchart showing the processing for case 2 referred to in the detail description section.

The above-described process for detecting an inner tangent is illustrated in FIGS. 16, 17, and 18.

To determine an initialized value, the process starts with step 900 of FIG. 16. The slope of $Q_0Q_{r(0)}$ is determined in step 910. The value of i=1 is subsequently set in step 920. In step 930, it is determined whether the slope Of $Q_0Q_{r(0)+i}$ is smaller than the preceding one. If so, $Q_0$ and $Q_{r(0)+i-1}$ are output as a solution to end the process in step 940. The process ends in step 960. If the slope of $Q_0Q_{r(0)+i}$ is not smaller than the preceding one, the i is incremented to repeat the process. This allows $Q_{t0}$ to be determined. Since ideals with only the points included in a convex hull, the incrementation of i means that the points inside the convex hull are sequentially examined. Thus, i is not equal to the number of the point. This is also applicable to FIGS. 17 and 18.

In FIGS. 17 and 18, the process is initiated in step 1210, and initialization is carried out to set m=1 in step 1220. It is subsequently checked in step 1230 whether or not $Q_{t(m-1)}$ is included in $U_m$, and if not, the process proceeds to step 1240. This case is the same as the case 1 above. If $Q_{t(m-1)}$ is included in $U_m$, the process proceeds to step 1380 (FIG. 18). This case is the same as the above case 2. The former case is first described. It is checked in step 1240 whether or not $Q_m$ is located below $Q_{s(m-1)}Q_{t(m-1)}$. If the result of this determination is positive, the slope Of $Q_mQ_{r(m)}$ is determined in step 1250. i=1 is then set in step 1260, and it is checked in step 1270 whether or not the slope of $Q_mQ_{r(m)+i}$ is smaller than the preceding one. If the result of this determination is negative, i is incremented by one, and the process returns to step 1270 (step 1280). If i=M (the last value of Q) is reached, $Q_M$ will be the solution. If it is determined in step 1270 that the slope of $Q_mQ_{r(m)+i}$ is smaller than the preceding one, $Q_m$ and $Q_{r(m)+i-1}$ are output in step 1290. The solution for a single m has been obtained, so m is incremented by one (step 1350).

If it is determined in step 1240 that $Q_m$ is not located below $Q_{s(m-1)}Q_{t(m-1)}$, the slope of $Q_{s(m-1)}Q_{t(m-1)}$ is determined using $Q_{s(m-1)}$ as the starting point in step 1300. i=1 is then set in step 1310, and it is checked in step 1330 whether or not the slope of $Q_{s(m-1)}Q_{r(m)+i}$ is smaller than the preceding one. If the result of this determination is negative, i is incremented by one in step 1320, and the process returns to step 1330. If m=M is reached as described above, $Q_M$ is output (not shown). If it is determined in step 1330 that the slope of $Q_{s(m-1)}Q_{r(m)+i}$ is smaller than the preceding one, $Q_{s(m-1)}Q_{r(m)+i-1}$ is output in step 1340. m is incremented by one in step 1350.

The process returns to step 1230, and continues in FIG. 18, if $Q_{t(m-1)}$ is included in $U_m$, and determines whether or not $Q_{s(m-1)}Q_{t(m-1)}$ is located below $Q_m$ in step 1380. If the result of this determination is negative, the solution will be $Q_{s(m-1)}$ and $Q_{t(m-1)}$, which are then output, as described above (step 1440). If, however, the result of step 1380 is positive, the slope of $Q_mQ_{t(m-1)}$ is determined in step 1390. i=1 is then set in step 1400, and it is checked in step 1410 whether or not the slope of $Q_mQ_{t(m-1-i)}$ is smaller than the preceding one. If this slope is not smaller than the preceding one, i is incremented by one in step 1420, and the process returns to step 1410. Otherwise, $Q_m$ and $Q_{t(m-i)}$ are output in step 1430.

After each of steps 1440 and 1430, m is incremented in step 1450, and the process returns to step 1360 in FIG. 17 wherein it is checked whether or not m has a value that causes the process to be ended. That is, since $Q_m$ and $Q_{r(m)}$ must be spaced an interval of at least T×N from each other, the process is ended if $Q_{r(m)}$ goes beyond $Q_M$. If m has such a value, the process is ended in step 1370. Otherwise, the process returns to step 1230.

As described above, one of the pairs of solutions determined which has the largest slope is determined as the final solution. If a plurality of pairs have the same slope, the one with the largest support, that is, with the largest width in the X direction is determined as the final solution.

The two required points have thus been obtained.

4.Interval output

The solution determined is $Q_{sm}$ and $Q_{tm}$, and as is apparent from the above description, the data included in the buckets between $B_{(sm+1)}$ and $B_{tm}$ meets the requirements of this invention. Therefore, the section between $x_{sm+1}$ of $B_{(sm+1)}$ and $y_{tm}$ of $B_{tm}$ is the target interval I.

By obtaining the interval I, the user can easily retrieve the required attributes of data included in the interval I. The attributes required by the user include, for example, data such as customers' names and addresses that are required in sending direct mails and customer IDs that are required in extracting customers who are likely to become bankrupt and which are used to stop loans to such customers. In relational databases, once the interval I has been determined, subsequent operations are easy, as described in the Background of the Invention section, so further description is omitted.

Figure 19:
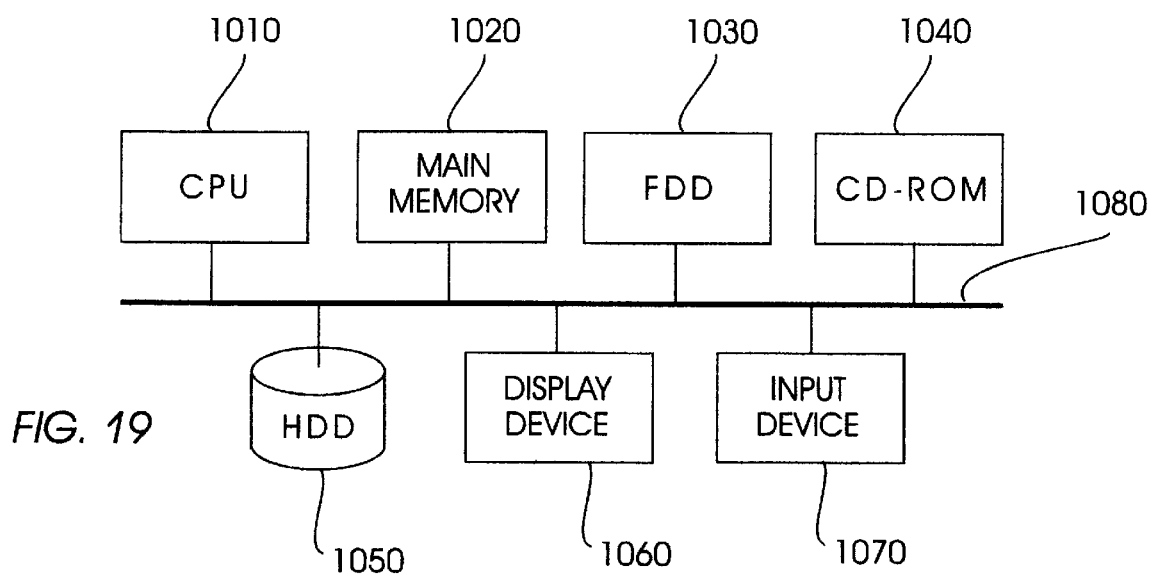
FIG. 19 shows the configuration of a typical general purpose computer in which this invention is implemented.

The process according to this invention has been described. This process may be implemented and executed by computer programs. For example, such programs can be executed by a normal computer such as shown in FIG. 19. Processing programs are stored in a hard disk drive (HDD) 1050, and in operation, loaded in a main memory 1020 and processed by a CPU 1010. The HDD 1050 includes a database that is accessed by the processing programs. The user inputs a value of a support T and data output instructions in an input device 1070. A display device 1060 displays a interval I determined and the required attributes of data included in the interval I as required. Input devices include a keyboard, a mouse, a pointing device, and a digitizer. The results of output can be stored in a floppy diskette (FDD) 1030 that is a sub-storage device, and new data can be entered therefrom. A CD-ROM drive 1040 can be used to input data.

Computer programs for implementing the process according to this invention can be stored and carried in a storage medium such as a floppy disk or a CD-ROM. In this case, the data retrieval portion of normal database retrieval programs or programs that perform only display operations in a display device 1060 may be already stored in the HDD 1050. Thus, the other portions or programs are normally carried in such a storage medium.

Figure 20:
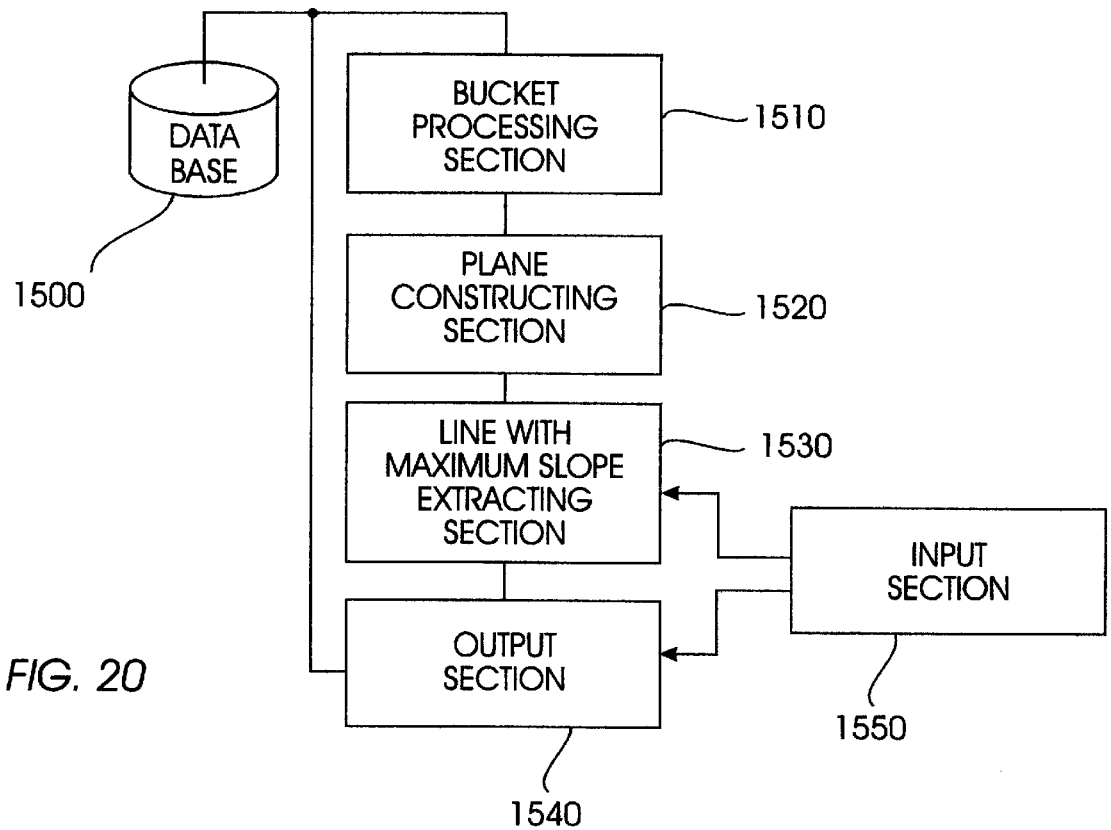
FIG. 20 is a block diagram showing a special apparatus in which this invention is implemented.

A special apparatus for executing only the process according to this invention may be provided. For example, an apparatus such as shown in FIG. 20 is conceivable. A database 1500 is connected to a bucket processing section 1510 and an output section 1540, and the bucket processing section 1510 is connected to a plane constructing section 1520. The output of the plane constructing section 1520 is connected to a line with maximum slope extracting section 1530 with its output connected to the output section 1540. An input section 1550 is connected to both the output section 1540 and the line with maximum slope extracting section 1530.

The bucket processing section 1510 carries out the bucket processing described above, and counts both the number of data sets in each bucket and the number of data sets with a 0–1 attribute of 1. The plane constructing section 1520 uses the results of the counting to carry out the plane construction processing as described above. Then, points Q the number of which corresponds to the number of the buckets are virtually plotted. Using the constructed plane, the line with maximum slope extracting section 1530 extracts a pair of points with the large slope according to a support T from the input section 1550, as described above. This enables the determination of two points Q corresponding to an interval I to be determined. The output section 1540 determines the interval I from this result, and extracts the appropriate attributes of data included in the interval I in response to a signal from the input section 1550 that transmits the user's input. The attributes are displayed on a display device (not shown), printed on a printing device, or stored in a floppy or a hard disk.

The apparatus in FIG. 19 is only an example, and any apparatus that can execute the above processing can be used for this invention. For example, a control section for controlling the overall process is provided to determine both the overall flow of processing and the output form of a signal from the input section 1550.

As described above, the correlation among data sets with a numerical attribute and a 0–1 attribute has been successfully determined.

The above processing has been successfully carried out at a high speed.

The interval I with both the maximum degree of confidence and T or larger support has been successfully determined.

What is claimed is:

1. A computer-implemented method for deriving an optimized confidence rule in a database having N data sets, each said data set including a numerical attribute and a 0–1 attribute, the method comprising the steps of:

partitioning the numeric attributes into a plurality of intervals;

determining a first number of data sets in each interval and a second number of data sets in each interval whose 0–1 attributes are 1;

virtually arranging the first numbers of data sets for said intervals along a first axis and the second numbers of data sets for said intervals along a second axis;

virtually constructing a plane using said first and second axes, and virtually plotting on said plane each point corresponding to each value set of the first and second numbers;

determining a pair of said points whose distance is equal to or greater than T×N in the direction of said first axis, where T is a predetermined ratio, and whose connection line has the largest slope;

determining the numeric attribute interval between said pair of points; and retrieving data attributes from the database based on the determined numeric attribute interval.

2. The method for deriving an optimized confidence rule according to claim 1, wherein each said interval is set so as to include a substantially identical number of data sets.

3. The method for deriving an optimized confidence rule according to claim 1, wherein said counting step comprises the steps of:

randomly sampling X of said N data sets;

sorting said X data sets according to a value of said numerical attribute;

holding the values of said numerical attribute of the i×X/M-th of the sorted data sets, for i=1, 2, . . . , M−1 where M is the number of intervals; and counting the number of data sets included in each interval, based on said held values.

4. The method for deriving an optimized confidence rule according to claim 1, wherein said extracting step comprises the steps of:

virtually creating a lower part of a plurality of convex hulls by sequentially connecting the plotted points together from the left of said first axis;

virtually creating an upper part of a plurality of convex hulls by sequentially connecting the plotted points together from the right of said first axis;

detecting inner tangents between one of said lower convex hulls and one of said upper convex hulls with leftmost end of which is the point spaced T×N apart in the direction of said first axis from the rightmost end of said one of lower convex hulls, said inner tangents having the largest slope; and selecting one of the pairs of points constituting a plurality of detected inner tangents, said inter tangent of said one of the pairs having the largest slope in said detected inner tangents.

5. A computer-implemented method for deriving an optimized confidence rule in a database having data sets, each said data set including a numerical attribute and a 0–1 attribute, comprising the steps of:

partitioning the numeric attributes into a plurality of intervals;

determining a first number of data sets in each interval and a second number of data sets in each interval whose 0–1 attributes are 1;

virtually arranging the first numbers of data sets for said intervals along a first axis and the second numbers of data sets for said intervals along a second axis;

virtually constructing a plane using said first and second axes, and virtually plotting on said plane each point corresponding to each value set of the first and second numbers;

determining a pair of said points whose distance is equal to or greater than B in the direction of said first axis, where B is a predetermined number of data sets, and whose connection line has the largest slope;

determining the numeric attribute interval between said pair of points; and retrieving data attributes from the database based on the determined numeric attribute interval.

6. An apparatus for deriving an optimized confidence rule in a database having N data sets, each said data set including a numerical attribute and a 0–1 attribute, comprising:

means for partitioning the numeric attributes into a plurality of intervals; means for determining a first number of data sets in each interval and a second number of data sets in each interval whose 0–1 attributes are 1;

means for virtually arranging the first numbers of data sets for said intervals along a first axis and the second numbers of data sets for said intervals along a second axis;

means for virtually constructing a plane using said first and second axes, and virtually plotting on said plane each point corresponding to each value set of the first and second numbers;

means for determining a pair of said points whose distance is equal to or greater than T×N in the direction of said first axis, where T is a predetermined ratio, and whose connection line has the largest slope;

means for determining the numeric attribute interval between said pair of points; and means for retrieving data attributes from the database based on the determined numeric attribute interval.

7. The apparatus for deriving an optimized confidence rule according to claim 6, wherein each said interval is set so as to include a substantially identical number of data sets.

8. The apparatus for deriving an optimized confidence rule according to claim 6 wherein said counting means comprises:

means for randomly sampling X of said N data sets;

means for sorting said X data sets according to a value of said numerical attribute;

means for holding the value of said numerical attribute of the i×X/M-th of the sorted data sets, for i=1, 2, . . . , M−1 where M is the number of buckets; and means for counting the number of data sets corresponding to each data set, based on said held values.

9. The apparatus for deriving an optimized confidence rule according to claim 6, wherein said extracting means comprises:

means for virtually creating a lower part of a plurality of convex hulls by sequentially connecting the plotted points together from the left of said first axis;

means for virtually creating a upper part of a plurality of convex hulls by sequentially connecting the plotted points together from the right of said first axis;

means for detecting inner tangents between one of said lower convex hulls and one of said upper convex hulls the leftmost end of which is the point spaced T×N apart in the direction of said first axis from the rightmost end of said one of lower convex hulls, said inner tangents having the largest slope; and means for selecting one of the pairs of points constituting a plurality of detected inner tangents, said inner tangent of said one of the pairs having the largest slope in said plurality of detected inner tangents.

10. An apparatus for deriving an optimized confidence rule in a database having data sets, each said data set including a numerical attribute and a 0–1 attribute, comprising:

means for partitioning the numeric attributes into a plurality of intervals; means for determining a first number of data sets in each interval and a second number of data sets in each interval whose 0–1 attributes are 1;

means for virtually arranging the first numbers of data sets for said intervals along a first axis and the second numbers of data sets for said intervals along a second axis;

means for virtually constructing a plane using said first and second axes, and virtually plotting on said plane each point corresponding to each value set of the first and second numbers;

means for determining a pair of said points whose distance is equal to or greater than B in the direction of said first axis, where B is a predetermined number of data sets, and whose connection line has the largest slope;

means for determining the numeric attribute interval between said pair of points; and means for retrieving data attributes from the database based on the determined numeric attribute interval.

11. A computer usable medium comprising program code means for deriving an optimized confidence rule in a database having N data sets, each said data set including a numerical attribute and a 0–1 attribute, said program code means comprising:

program code means for causing the computer to partition the numeric attributes into a plurality of intervals;

program code means for causing the computer to determine a first number of data sets in each interval and a second number of data sets in each interval whose 0–1 attributes are 1;

program code means for causing the computer to virtually arrange the first numbers of data sets for said intervals along a first axis and the second numbers of data sets for said intervals along a second axis;

program code means for causing the computer to virtually construct a plane using said first and second axes, and virtually plot on said plane each point corresponding to each value set of the first and second numbers;

program code means for causing the computer to determine a pair of said points whose distance is equal to or greater than T×N in the direction of said first axis, where T is a predetermined ratio, and whose connection line has the largest slope;

program code means for causing the computer to determine the numeric attribute interval between said pair of points; and program code means for causing the computer to retrieve data attributes from the database based on the determined numeric attribute interval.

12. The computer usable medium according to claim 11, wherein each of said plurality of intervals is set so as to include a substantially identical number of data sets.

13. The computer usable medium according to claim 11, wherein said counting program code means comprises:

program code means for causing said computer to randomly sample X of said N data sets;

program code means for causing said computer to sort said X data sets according to a value of said numerical attribute;

program code means for causing said computer to hold the value of said numerical attribute of the i×X/M-th of the sorted data sets, for i=1, 2, . . . , M−1 where M is the number of intervals; and program code means for causing said computer to count the number of data sets corresponding to each data set, based on said held values.

14. The computer usable medium according to claim 11, wherein said extracting program code means comprises:

program code means for causing said computer to virtually create a lower part of a plurality of convex hulls by sequentially connecting the plotted points together from the left of said first axis;

program code means for causing said computer to virtually creating a upper part of a plurality of convex hulls by sequentially connecting the plotted points together from the right of said first axis;

detecting program code means for causing said computer to detect inner tangents between one of said lower convex hulls and one of said upper convex hulls the leftmost end of which is the point spaced T×N apart in the direction of said first axis from the rightmost end of said one of lower convex hulls, the inner tangents having the largest slope; and program code means for causing said computer to select one of the pairs of points constituting a plurality of detected inner tangents, said inner tangent of said one of the pairs having the largest slope in said detected inner tangents.

15. A computer usable medium comprising program code means for deriving an optimized confidence rule in a database having data sets, each said data set including a numerical attribute and a 0–1 attribute, said program code means comprising:

program code means for causing the computer to partition the numeric attributes into a plurality of intervals;

program code means for causing the computer to determine a first number of data sets in each interval and a second number of data sets in each interval whose 0–1 attributes are 1;

program code means for causing the computer to virtually arrange the first numbers of data sets for said intervals along a first axis and the second numbers of data sets for said intervals along a second axis;

program code means for causing the computer to virtually construct a plane using said first and second axes, and virtually plotting on said plane each point corresponding to each value set of the first and second numbers;

program code means for causing the computer to determine a pair of said points whose distance is equal to or greater than B in the direction of said first axis, where B is a predetermined number of data sets, and whose connection line has the largest slope;

program code means for causing the computer to determine the numeric attribute interval between said pair of points; and program code means for causing the computer to retrieve data attributes from the database based on the determined numeric attribute interval.

* * * * *